United States Patent [19]

Byerly

[11] 4,441,677
[45] Apr. 10, 1984

[54] CLAMP DEVICE

[75] Inventor: Robert M. Byerly, Burbank, Calif.

[73] Assignee: TA Mfg., Inc., Glendale, Calif.

[21] Appl. No.: 365,104

[22] Filed: Apr. 2, 1982

[51] Int. Cl.³ .............................................. F16L 3/08
[52] U.S. Cl. ............................ 248/74.3; 24/16 PB; 24/DIG. 22
[58] Field of Search ............. 248/74 A, 74 B, 74 PB, 248/68 R, 316 R, 316 D, 309.1, 217.2, 216.4, 216.1, 217.3; 24/DIG. 22, 16 PB

[56] References Cited

U.S. PATENT DOCUMENTS

| | | | |
|---|---|---|---|
| 2,408,572 | 10/1946 | Morehouse | 248/74 B |
| 2,416,063 | 2/1947 | Nicholls | 248/74 B |
| 2,632,217 | 3/1953 | Flora | 248/74 PB |
| 2,922,733 | 1/1960 | Henning | 248/74 B |
| 3,041,025 | 6/1962 | Daly | 248/74 B |
| 3,161,210 | 12/1964 | Loof | 248/74 PB |
| 3,606,218 | 9/1971 | Enlund et al. | 248/74 A |
| 4,313,587 | 2/1982 | Loeschen | 248/217.2 |

Primary Examiner—William H. Schultz
Assistant Examiner—Ramon O. Ramirez
Attorney, Agent, or Firm—Charles H. Schwartz; Ellsworth R. Roston

[57] ABSTRACT

A clamp device including a resilient lining and with the clamp including an elongated member having a loop portion, and a resilient lining formed by a strip of resilient material of a sufficient length to extend along the elongated member in the loop portion and of a sufficient width to extend across the elongated member in the loop portion. The strip of resilient material is formed on one side of the strip for attachment to the loop portion of the elongated member so as to have the strip form a resilient lining on the inside of the loop portion of the elongated member. The strip of resilient material includes gripping means formed on the other side of the strip and with the gripping means formed as a plurality of needle-like protruberences extending along the length and across the width of the strip from the other side of the strip and toward the center of the loop portion of the elongated member. Individual ones of the needle-like protruberences may be staggered relative to adjacent others of the needle-like protruberences across the width of the strip. Also, rows of ones of the individual needle-like protruberences may have different heights relative to others of the individual needle-like protruberences.

20 Claims, 6 Drawing Figures

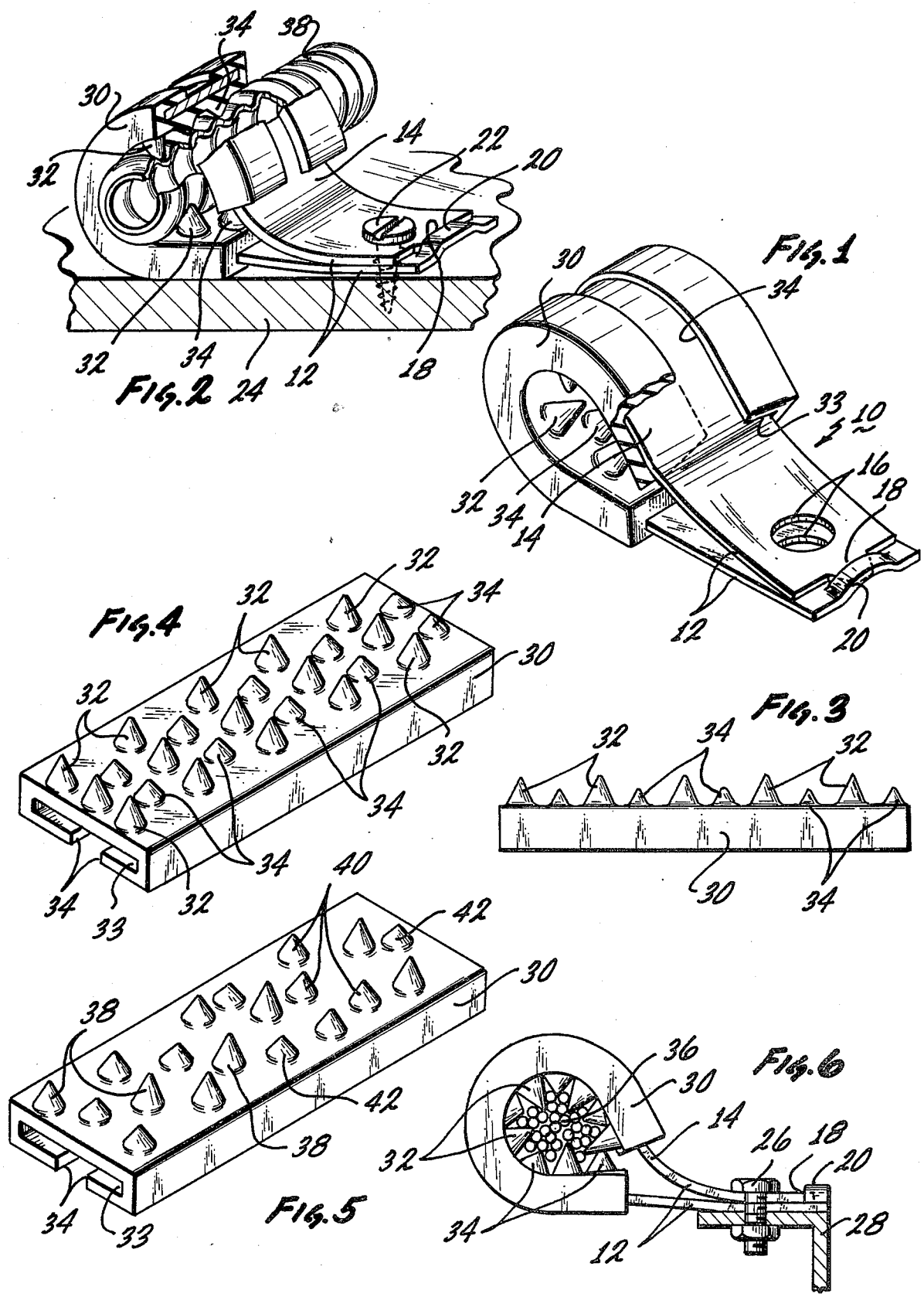

CLAMP DEVICE

BACKGROUND OF THE INVENTION

1. Field of the Invention

The present invention is directed as a cushioned clamp device and specifically a clamp device for mounting and restraining wires, wiring conduit and similar structures. In particular, the present invention is directed to a cushioned clamp device to securely mount and restrain the wires, wiring conduit and similar structures and at the same time preventing abrasion and chaffing of the restrained wires or wiring conduit.

2. Description of the Prior Art

In general, conventional clamp devices are formed as a loop having a smooth cushioned lining which lining extends around the loop and with this cushioned clamp used to mount and restrain a plurality or bundle of wires or wiring conduit. This smooth, resilient lining, however, only provides point contact with the outer wires in the bundle or the outer surface of the wiring conduit. Therefore, the bundle of wires or wiring conduit may not be firmly secured. In addition, the clamp device of the prior art cannot accomodate a large range of different size bundles of wires or wiring conduit of different diameters.

One improvement on the conventional smooth, resilient lining for a clamp device is shown in U.S. Pat. No. 3,995,795 listing John Hogan as the inventor. This patent includes a resilient lining referred to as an "anti-chafe support" and including uniform sized serrations or nodes of a gear-like teeth configuration provided on the inside surface of the loop clamp. In the prior art device shown in U.S. Pat. No. 3,995,795, the serrations or nodes tend to become bunched as they are bent into the loop configuration and thereby lose their effective gripping action for different size bundles of wires and different size diameter wiring conduit. Also, because of the bunching, the gripping of individual wires in a bundle between individual serrations or ridges is hindered.

SUMMARY OF THE INVENTION

The present invention is directed to a cushioned clamp which overcomes the problems of the prior art devices as described above. In particular, the present invention includes a resilient lining for a loop clamp and with the resilient lining formed with a plurality of pointed, needle-like protruberences which extend along the length and across the width and toward the center of the loop clamp. The needles may be formed in rows and preferably the needles in adjacent rows are staggered relative to each others across the width. This tends to eliminate bunching between individual protruberences when the resilient lining is formed into a loop and thereby allows individual wires to be gripped between the individual needle-like protruberences and thereby helps to position and secure individual wires which in turn helps to secure the bundle of wires.

In another preferred form of the invention, particular ones of the pointed needle-like protruberences are shorter in height than others of the protruberences. In particular, alternate rows of protruberences have a different height relative to the protruberences in the interleaved rows. This allows the clamp of the present invention to grasp and restrain bundles of wires or wiring conduit of different size.

As a further embodiment of the present invention, individual needle-like protruberences in each row can have different sizes or the needle-like protruberences can have a pseudo-random pattern of different size needles along the length and across the width of the lining so as to grasp bundles of wires or wiring conduit of different sizes.

A BRIEF DESCRIPTION OF THE DRAWINGS

A clearer understanding of the present invention will be had with reference to the following description and drawings: wherein FIG. 1 is a perspective view of a clamp device of the present invention including a resilient lining incorporating pointed needle-like protruberences;

FIG. 2 is another perspective view of the clamp of FIG. 1 showing the clamp mounting and restraining a wiring conduit;

FIG. 3 is a perspective view of a first embodiment of the resilient lining prior to mounting on the clamp and showing the needle-like protruberences in rows;

FIG. 4 is a side view of the embodiment of FIG. 3;

FIG. 5 is a perspective view of the second embodiment of the resilient lining prior to mounting on the clamp and showing an alternate, pseudo-random configuration for the needle-like protruberences, and FIG. 6 is a side view similar to FIG. 2 illustrating the clamp device of the present invention mounting and restraining a bundle of wires.

DESCRIPTION OF THE PREFERRED EMBODIMENTS

In FIG. 1, a perspective view of a clamp device is shown incorporating the features of the present invention. The clamp device includes a metalic loop member 10 including leg portions 12 and a loop portion 14. Openings 16 pass through the leg portions 12 and with one leg portion including a tab 18 to fit within a slot formed by a raised portion 20 in the other leg portion. The tab may positioned within the slot to provide for a preliminary locking of the two leg members prior to the two leg members being held together by a screw device passing through the openings 16. The screw device may be a screw member such as the screw member 22 shown in FIG. 2 to secure the clamp to a support surface 24. Alternatively, the same device may be a nut and bolt such as the nut and bolt 26 shown in FIG. 6 to attach the clamp to some support surface such as the flange portion 28.

The clamp device of the present invention incorporates a resilient lining formed by a strip of soft rubber-like resilient material 30 which includes a passageway 33 to accomodate the metal clamp 10 and with a channel 35 on the back surface of the lining 30 to make it easier to dispose the strip of resilient material around the loop portion 14 of the metal clamp 10. As shown in FIGS. 3 and 5, the strip of resilient material 30 has essentially a "C" shaped cross-section and has a length sufficient to extend along the loop portion 14 and has a width sufficient to extend across the loop portion 14.

FIGS. 3 and 4 show a first embodiment of a resilient lining having a first particular configuration of integrally molded, needle-like protruberences and FIG. 5 shows a second embodiment of the resilient lining showing a second particular configuration of needle-like protruberences. Specifically, in FIGS. 3 and 4 the needle-like are staggered relative to each other in alternate rows across the width of the strip of resilient material 30. Specifically, a first group of rows 32 of needle-like protruberences alternate with a second group of rows 34 of needle-like protruberences. The rows 12 include three (3) protruberences and the rows 34 include two (2) protruberences and with the protruberences in adjacent rows staggered relative to each other across the width of the strip of resilient material 30.

When the strip 30 is rolled up into the loop, as shown in FIGS. 1, 2 and 6, the individual needle-like protruberences cannot bunch up because they are staggered relative to each other across the width of the resilient lining. This allows the individual protruberences to extend between individual wires in a bundle of wires, such as shown for example in FIG. 6. Because of the staggering of the individual protruberences and also because the protruberences can bend in different directions, the protruberences can securely grasp individual wires in the bundle, thereby retaining the bundle of wires.

Also because the staggering prevents bunching, the strip 30 may accomodate different sizes of bundles of wires 36, as shown in FIG. 6, and also accomodate different size diameter wiring conduit 38, as shown in FIG. 2. The protruberences extend into the convolutions of the wiring conduit 38 as shown in FIG. 2 to securely grip the conduit. To further accomodate the different size bundles of wires 36 or different size diameter wiring conduit 38, the protruberences in alternate rows may be shorter in height. Specifically, as shown in FIGS. 3 and 4, the protruberences in the rows 34 are shorter than the protruberences in the rows 32.

It is to be appreciated that the protruberences extending from the strip of resilient material 30 forming the resilient lining may have different configurations than that shown in FIGS. 3 and 4. For example, the protruberences in a single row may have different sizes. Alternately, the protruberences may have a pseudo-random pattern of different size protruberences as shown in FIG. 5, where there is a pseudo-random pattern of a first size protruberences 38 interspersed with a pseudo-random pattern of second size protruberences 40 and further interspersed with a pseudo-random pattern of a third size protruberences 42. The different size protruberences in the pseudo-random pattern provides for the resilient lining retaining and securely gripping bundles of cables of different sizes or wiring conduit of different size diameter. As shown in FIG. 5, the pseudo-random pattern provides staggering between protruberences so as to prevent bunching which would tend to reduce the amount of gripping.

The present invention, therefore, provides for a clamp device including an improved resilient lining whereas the resilient lining is formed by a strip of soft, rubber-like resilient material and includes a plurality of integrally molded, needle-like protruberences extending toward the center of the loop and with these protruberences staggered relative to each other across the width of the lining to eliminate bunching between adjacent protruberences and with the protruberences having different heights relative to each other to accomodate different size bundles of wires and different diameter wiring conduit.

Although the invention has been described with reference to particular embodiments, it is to be appreciated that various adaptations and modifications may be made and the invention is only to be limited by the appended claims.

I claim:

1. A clamp device including a resilient lining, including
    clamp means formed by an elongated member and including at least a loop portion,
    a resilient lining formed by a strip of resilient material of a sufficient length to extend along the elongated member in the loop portion and of a sufficient width to extend across the elongated member in the loop portion,
    the strip of resilient material including means formed on one side of the strip for attaching the strip to the loop portion of the elongated member to have the strip form a resilient lining on the inside of the loop portion of the elongated member, and
    the strip of resilient material including gripping means formed on the other side of the strip and with the gripping means formed as a plurality of needle-like protruberences extending from the other side of the strip along the length of the strip and toward the center of the loop portion of the elongated member and with individual ones of the needle-like protruberences staggered relative to adjacent others of the needle-like protruberences across the width of the strip.

2. The clamp device of claim 1 wherein the plurality of individual needle-like protruberences are arranged in rows across the width of the strip and with the protruberences in adjacent rows staggered relative to each other.

3. The clamp device of claim 2 wherein the adjacent rows of individual needle-like protruberences have different heights relative to each other.

4. The clamp device of claim 1 wherein individual ones of the plurality of individual needle-like protruberences have different heights relative to individual others of the plurality of protruberences.

5. The clamp device of claim 1 wherein the plurality of individual needle-like protruberences are arranged in a pseudo-random pattern along and across the strip.

6. The clamp device of claim 5 wherein individual ones of the plurality of needle-like protruberences have a different height relative to others of the plurality of protruberences.

7. A resilient lining for use with a clamp device having clamp means formed by an elongated member and including at least a loop portion, including
    a resilient lining formed by a strip of resilient material of a sufficient length to extend along the elongated member in the loop portion and of a sufficient width to extend across the elongated member in the loop portion,
    the strip of resilient material including means formed on one side of the strip for attaching the strip to the loop portion of the elongated member to have the strip form a resilient lining on the inside of the loop portion of the elongated member, and
    the strip of resilient material including gripping means formed on the other side of the strip and with the gripping means formed as a plurality of needle-like protruberences extending from the other side of the strip along the length of the strip and toward the center of the loop portion of the elongated member and with individual ones of the needle-like protruberences staggered relative to adjacent others of the needle-like protruberences across the width of the strip.

8. The resilient lining of claim 7 wherein the plurality of individual needle-like protruberences are arranged in rows across the width of the strip and with the protruberences in adjacent rows staggered relative to each other.

9. The resilient lining of claim 8 wherein the adjacent rows of individual needle-like protruberences have different heights relative to each other.

10. The resilient lining of claim 7 wherein individual ones of the plurality of individual needle-like protruberences have different heights relative to individual others of the plurality of protruberences.

11. The resilient lining of claim 7 wherein the plurality of individual needle-like protruberences are arranged in a pseudo-random pattern along and across the strip.

12. The resilient lining of claim 11 wherein individual ones of the plurality of needle-like protruberences have a different height relative to others of the plurality of protruberences.

13. A clamp device including a resilient lining, including
    clamp means formed by an elongated member and including at least a loop portion,
    a resilient lining formed by a strip of resilient material of a sufficient length to extend along the elongated member in the loop portion and of a sufficient width to extend across the elongated member in the loop portion,
    the strip of resilient material including means formed on one side of the strip for attaching the strip to the loop portion of the elongated member to have the strip form a resilient lining on the inside of the loop portion of the elongated member, and
    the strip of resilient material including gripping means formed on the other side of the strip and with the gripping means formed as a plurality of needle-like protruberences extending from the other side of the strip along the length and across the width of the strip and toward the center of the loop portion of the elongated member and with individual ones of the needle-like protruberences having different heights relative to individual others of the plurality of needle-like protruberences.

14. The clamp device of claim 13 wherein the plurality of individual needle-like protruberences are arranged in rows across the width of the strip and with the protruberences in adjacent rows staggered relative to each other across the width of the strip.

15. The clamp device of claim 14 wherein the adjacent rows of individual needle-like protruberences have different heights relative to each other.

16. The clamp device of claim 13 wherein the plurality of individual needle-like protruberences are arranged in a pseudo-random pattern along and across the strip.

17. A resilient lining for use with a clamp device having clamp means formed by an elongated member and including at least a loop portion, including
    a resilient lining formed by a strip of resilient material of a sufficient length to extend along the elongated member in the loop portion and of a sufficient width to extend across the elongated member in the loop portion,
    the strip of resilient material including means formed on one side of the strip for attaching the strip to the loop portion of the elongated member to have the strip form a resilient lining on the inside of the loop portion of the elongated member, and
    the strip of resilient material including gripping means formed on the other side of the strip and with the gripping means formed as a plurality of needle-like protruberences extending from the other side of the strip along the length and across the width of the strip and toward the center of the loop portion of the elongated member and with individual ones of the needle-like protruberences having different heights relative to individual others of the plurality of needle-like protruberences.

18. The resilient lining of claim 17 wherein the plurality of individual needle-like protruberences are arranged in rows across the width of the strip and with the protruberences in adjacent rows staggered relative to each other across the width of the strip.

19. The resilient lining of claim 18 wherein the adjacent rows of individual needle-like protruberences have different heights relative to each other.

20. The clamp device of claim 17 wherein the plurality of individual needle-like protruberences are arranged in a pseudo-random pattern along and across the strip.

* * * * *